(12) United States Patent
Stone et al.

(10) Patent No.: US 6,605,652 B1
(45) Date of Patent: Aug. 12, 2003

(54) ENERGY CURABLE INKS AND METHODS OF PREPARING SAME

(75) Inventors: Edward Stone, Morris Plains, NJ (US); Gordon Kotora, Clifton, NJ (US); Neil Young, Oakland, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/481,070

(22) Filed: Jan. 11, 2000

(51) Int. Cl.$^7$ ............... C09D 11/10; C08L 67/00
(52) U.S. Cl. ............... 523/160; 524/599; 524/601
(58) Field of Search ............... 523/160, 161; 106/31.6, 31.28, 31.27; 524/599, 601, 600; 528/271

(56) References Cited

U.S. PATENT DOCUMENTS

| | | | | |
|---|---|---|---|---|
| 3,961,965 A | * | 6/1976 | Zwahlen | 106/31.37 |
| 4,040,995 A | * | 8/1977 | Sekmakas et al. | 524/377 |
| 4,239,866 A | * | 12/1980 | Reitel et al. | 525/440 |
| 4,270,985 A | | 6/1981 | Lipson et al. | 204/15 |
| 4,368,316 A | * | 1/1983 | Laddha et al. | 528/295.5 |
| 5,312,877 A | * | 5/1994 | Avci et al. | 524/444 |
| 5,349,010 A | * | 9/1994 | Kuo | 524/600 |
| 5,385,788 A | * | 1/1995 | Sanderson | 428/458 |
| 5,834,118 A | | 11/1998 | Ranby et al. | 428/482 |

FOREIGN PATENT DOCUMENTS

| | | |
|---|---|---|
| GB | 2077 279 A | 5/1981 |
| WO | WO 98/46689 | 10/1998 |

OTHER PUBLICATIONS

Johannsson Mats and Hult Anders; "Synthesis, Characterizatin, and UV Curing of Acrylate Functional Hyperbranched Polyester Resins", Journal of Coatings Technology, vol. 67, No. 849, pp. 37–39, Oct. 1995.

Hult Anders, Malmstrom Eva and Johannson Mats, "UV Curing of Acrylate Functional Hyperbranched Polyesters", Polymeric Materials Science and Engineering, vol. 72, pp. 528–529, 1995.

\* cited by examiner

*Primary Examiner*—Callie Shosho
(74) *Attorney, Agent, or Firm*—Sidney Persley

(57) ABSTRACT

An energy curable printing ink composition containing a branched polyester comprising monofunctional and difunctional components having an excess functionality of about 0.1 to 0.20. Also described is a method of reducing misting and/or dot gain in an energy curable printing ink composition by adding such branched polyesters to the composition.

17 Claims, 2 Drawing Sheets

ENERGY CURABLE INKS AND METHODS OF PREPARING SAME

FIELD OF THE INVENTION

This invention relates to novel energy curable inks in which non-reactive branched polyesters are used to reduce misting. The invention also relates to methods of reducing misting and/or dot gain in ink compositions by using non-reactive branched polyester resins.

BACKGROUND OF THE INVENTION

The use of gelled or structured varnishes is very important in controlling a number of printing problems. Two important functions of the gel varnish are controlling misting and dot gain.

Misting occurs when small droplets of ink are expelled from printing nips due to high printing speeds and low ink structure. They are a health and clean-up problem. These droplets form an aerosol which stays in the air and coats equipment, and also may be inhaled by plant employees. A gelled or structured varnish controls this by giving the ink enough elasticity so that the ink is pulled back into the press, and small droplets are less likely to be formed and expelled.

Dot gain is the spreading of dots of ink on paper to produce poor image quality. Again, the gelled or structured varnish prevents this by adding enough structure to the ink to prevent easy spreading.

Conventional UV curable paste inks, customarily use gelled resins to impart higher structure and viscosity, and improve properties such as misting and dot gain. The gelled vehicles are produced from resins that are reacted with chelating agents such as aluminum alkoxides. These materials, known as gellants, form coordinate covalent and hydrogen bonds. The amount of each type of bonding varies with the gellant being used. However, there is a significant drawback to this method of imparting structure. Most of the diluents used in UV inks are reactive acrylate monomers, which are fairly polar. These polar solvents cause a breakdown in the hydrogen bonding structure when added to the gelled varnish. To compensate for this, the varnishes are typically gelled with a very high level of gellant, which results in inks with poor flow and transfer. These are relatively hard to handle due to their high structure. They also make the inks print poorly owing to poor water emulsification properties.

It has now been found that resins that are designed to provide structure through crosslinking and entanglements are much more robust and do not suffer a loss of structure when mixed with polar solvents. According to the present invention, branched polyesters are such polymers since they provide structure through a combination of branching and chain entanglements to mimic the rheological properties of a "gelled varnish." While branched polyesters are known in the prior art, this invention provides for the first time their use in energy curable printing inks and coatings This invention is also provides formulations containing branched polyesters which are incorporated in a UV curable printing ink by design to control ink properties.

SUMMARY OF THE INVENTION

The present invention relates to an energy curable printing ink composition having low misting and dot gain properties. Specifically, the printing ink composition of the invention includes non-reactive highly branched polyester resins that are designed to provide structure through crosslinking and entanglements and thereby increase rheology and reduce misting.

DETAILED DESCRIPTION OF THE INVENTION

Figure 1B:
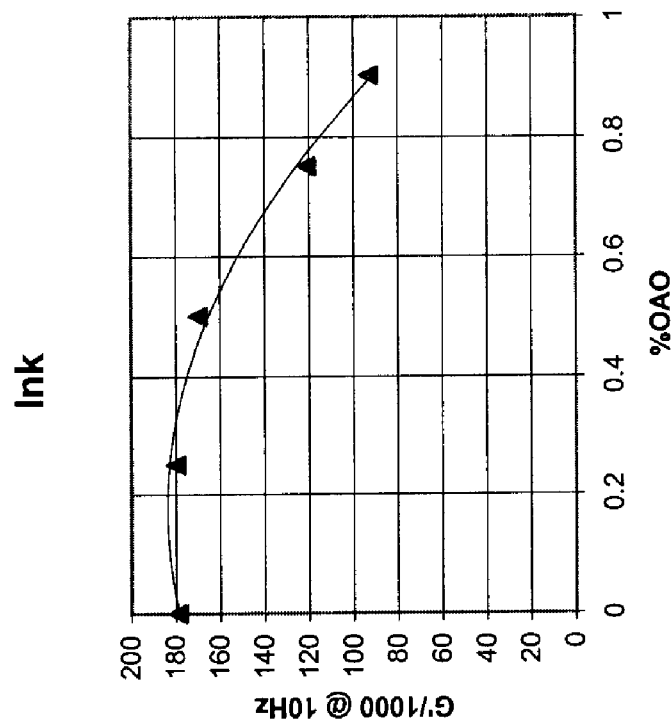
FIGS. 1A and 1B show the effect of gellant level on elasticity (G') in varnish (1A) formulations and UV curable ink (1B). The level of gellant (OAO) in the UV let down varnish was varied from 0 to 0.9% in five steps. The inks formulated were then tested for misting using a Thwing Albert electronic inkometer, and for rheology using a Carri-Med CSL 500 rheometer. The gellant levels of the varnishes were 0.0%, 0.25%, 0.5%, 0.75%, and 0.9%. Contrary to what was expected, inks produced using higher gellant levels had lower elasticity (G') and had greater misting than inks using little or no gellant. In fact, the inks with the least gellant (0 and 0.25%) yielded the least misting and highest elasticity (see Table 2, for formulas and misting results). To simplify the investigation, Cyan inks were used as the standard, since all pigment color (such as Magenta and Yellow) showed the same results. To determine if the loss in elasticity with higher gellant level was due to varnish structure, or due to some other factor in the ink, various varnishes (containing 52.5% Branched Polyester #1 as described in Table 1) containing different amounts of gellants (OAO) were investigated. When these were analyzed on the Carri-Med CSL-500, it was found that increasing gellant level increased the G' of the varnish.

It has now been found that the objectives of this invention are realized by employing novel energy curable inks in which non-reactive branched polyesters are used to reduce misting by increasing the elasticity of the printing ink. Highly branched polyesters provide the proper viscosity and other Theological properties required of a good lithographic ink without gelling or adding clay or talc. Energy curable inks are normally cured by radiation sources, preferably ultra violet (UV) or electron beam (EB) radiation.

In order to better understand the phenomenon of misting, and the Theological factors involved in its control, studies were undertaken to see how various resin properties and bodying additives affected the rheology and misting of UV curable paste inks.

The resin structure in the varnish of the UV Curable Inks was altered by changing the degree of branching and molecular weight. The degree of gellation was also varied from no gellant to a high level of gellant. Increases in degree of gellation resulted in inks that misted more, contrary to the findings with heatset inks. The molecular weight of the resin in the let down varnish also had minimal impact. The most dramatic effect was caused by altering the amount of covalent branching in the polymer. An increase in branching resulted in an increase in elasticity of the inks and a reduction in misting. At high levels of branching, no mist control agent, i.e. clay, was needed to control the misting of the printing ink.

The energy curable printing ink composition of the present invention comprises a branches polyester which has monofunctional components, and components with two or more functional groups and wherein the excess functionality (xsf) is from about 0.140 to 0.180, preferably from about 0.147 to 0.16. The excess functionality of the branched polyesters of the present invention (xsf) is defined as follows: $xsf=\Sigma m_i (f_i-2)$, where m is the mol fraction of the monofunctional or multifunctional component I, and f is the functionality of component i.

The functional groups of the multifunctional component may be any suitable carboxylic acid or hydroxyl groups. For example, the components with at least three functional groups may be multifunctional hydroxyl or carboxylic acids. Typical hydroxyl compounds include but are not limited to: Abitol; Butylene glycol; Cyclohexanedimethanol; Diethylene glycol; Dipentaerythritol; Dipropylene glycol; Ethylene glycol; Glycerine; Hexylene glycol; Hydrogenated Bisphenol A; Methyl 1,2 propanediol; Neopentylglycol; Pentaerythritol; Propylene glycol; Sorbitol; Triethylene glycol; Trimethylolethane; Trimethylolpropane; and Tripentaerythritol.

Typical carboxylic acid compounds include but are not limited to: Abietic acid; Acetic acid; Adipic acid; Azelaic acid; Benzoic acid; Capric acid; Caproic acid; Caprylic acid; Citric acid; Crotonic acid; Dimer acid; Dimetholpropionic acid; Dimethyl terephthale; Dimethylolpropionic acid; Ethylhexanoic acid; Fatty acids; Fumaric acid; Hexahydrophthalic anhydride; Isophthalic acid; Lauric acid; Maleic acid; Maleic anhydride; Methyl hexahydrophthalic anhydride; Palmitic acid; Pelargonic acid; Phthalic acid; Phthalic anhydride; Propionic acid; p-tert-Butylbenzoic acid; Sebacic acid; Succinic anhydride; Terephthalic acid; Tetrahydrophthalic anhydride; and Trimellitic anhydride.

The functional groups of the monofunctional component (typically having acidic functional groups) of the branched polyesters of the present invention may comprise benzoic acid, palmitic acid, aliphatic, cycloaliphatic and aromatic carboxyl acids. Monofunctional hydroxyl-containing compounds may also be used. These include benzyl, aliphatic, cycloaliphatic and aromatic alcohols.

Optionally, the branched polyesters may further include difunctional components such as phthalic anhydride, neopentyl glycol, saturated, unsaturated, aliphatic, cycloaliphatic and aromatic diols or dicarboxylic acids. These branched polyesters may further contain multifunctional components such as pentaerythritol trimethylolethane, trimethylolpropane or trimellitic anhydride, etc.

The average molecular weight of the branched polyester is about 1,000 to 10,000, and preferably about 2,000 to 4,000, and more preferably about 3,000 to 3,500.

The branched polyesters of the present invention provide the proper viscosity and other rheological properties required of a good lithographic ink without gelling or the need to add clays or other rheology control additives. In addition, the new polyester resins of the present invention are easier to manufacture and less costly than the gelled varnishes. The new resins are also covalently bonded so that their rheological properties are not affected by H-bonding with the solvent. In addition, the inks made from these polyester resins are easier to manufacture, less expensive and offer improved lithographic properties (e.g. reduced misting) than their gelled counterparts.

A trial on a Miehle press demonstrated that inks formulated with covalently branched resins required no gellant or clay to control misting and rheology. These inks performed well on press, demonstrating better flow, superior transfer, less dot gain, and overall better press performance.

Rheological measurements were carried out using a Carri-Med CSL-500 Rheometer from TA Instruments. A 2°, 4 cm cone was used to perform the measurements. Ink measurements were made at 30° C. using a Peltier plate to keep a constant temperature. Oscillation measurements were first carried out manually at 1 Hertz at variable torque to determine the linear viscoelastic region for each ink sample. After determination, a frequency sweep was done at 1–10 Hertz to determine Theological parameters such as G' and G". Viscosity measurements were carried out in the flow mode from 0–25,000 dyne/cm$^2$.

These measurements allowed the determination of the specific ink structures that control rheology. From oscillation measurements, values for G' (elastic modulus), G" (loss modulus), tan($\delta$) (G"/G') and $\eta^*$ (complex viscosity) were obtained by non-destructive measurements. These values were then compared against "real-life" measurements such as tack and misting to provide a correlation between Theological parameters and press performance. Using this information, specific resins and varnishes were chosen to give the desired properties.

Ink tack and misting were measured on a Thwing Albert Model 101 electronic inkometer. Tack and misting were recorded for 1 minute at 1200 rpm and 90° F. Misting was measured visually on an empirical scale of 1–5 with 5 representing no misting and 1 being severe misting.

Based on the results of the misting studies, and also on the results of the Carri-Med data, the use of gellant produced opposite results to what was expected. The varnishes with the highest level of gellant produced inks that misted more than inks with less gellant. This may be due to a disruption of hydrogen bonding of the gelled structure by the polar acrylates used in this ink. The molecular weight of the resin did not seem to have a dramatic effect on misting, but the changes were very small due to physical constraints needed for the varnish. The most dramatic effect was found when the degree of branching was altered in the resin. With a high degree of branching, the misting was controlled without the use of clay. The manufacture of varnishes using this increased branched concept for UV curable inks produced inks with much better flow characteristics than standard inks.

EXAMPLE 1

Preparation of Branched Polyesters
Branched Polyester A

Phthalic anhydride (554.3 g), neopentyl glycol (309.7 g), pentaerythritol (102.7 g), palmitic acid (20.4 g), benzoic acid (11 g) and Fascat 41000 (2 g) were charged. The mixture was then subsequently heated under a nitrogen blanket to 220° C.–230° C., with the water distillate being removed. This condition was held until an acid number of 21–23 was reached. About 67 g of distillate resulted. This gave a material with an acid number of 21.5 and a softening point of 106° C.

Branched Polyester B

Polyethylene terephthalate (PET, 532.6 g), 1,2-propanediol (60.2 g), glycerine (98.3 g) and 4.2 g of tetra-n-butyl titanate (4.2 g) were charged. The mixture was subsequently heated under reflux and nitrogen blanket to 215–220° C. This was held for formation of a solution (about 3 hours). The flask was then set for distillate removal. Trimellitic anhydride (115.2 g), maleic anhydride (47.6 g) and benzoic acid (193.4) were then added. The batch was heated to 2400C and held for an acid number 26–28. About 51.5 g of distillate resulted. This gave a resin with an acid number of 27.8 and a softening point of 101° C.

Putting Branched Polyesters into Solution

Branched polyester B (575.2 g), 57.5 grams of Benzoflex 400 (organic solvent) and 0.9 grams of 4-methoxyphenol were charged. The mixture was subsequently heated under nitrogen blanket, to 140–150° C. and held for formation of solution. The solution was then cooled to 115° C., switched to an air sparge, and tripropylene glycol diacrylate (364.4 g) was charged to it. The solution was held at 90–95° C. for a Haake viscometer at 60° C., resulting in Eta #4 (D=170 [1/s]) of 11 and an Ostwald B value of 0.84.

Branched polyesters 1–6 (BP#1–6) were synthesized in a similar fashion to branched polyesters A and B. Table 1 shows the composition of these polyesters:

TABLE 1

Composition in equivalents of Branched Polyesters 1–6

BRANCHED POLYESTERS

| MATERIALS | BP #1* | BP #2 | BP #3 | BP #4 | BP #5 | BP #6 |
|---|---|---|---|---|---|---|
| Palmitic Acid | .020 | 0.025 | 0.016 | 0.012 | 0.008 | 0 |
| Benzoic Acid | .020 | 0.025 | 0.016 | 0.013 | 0.009 | 0 |
| Phthalic Anhydride | 0.714 | 0.700 | 0.724 | 0.735 | 0.751 | 0.782 |
| Pentaerythritol | 0.269 | 0.264 | 0.275 | 0.280 | 0.290 | 0.290 |
| Neopentyl Glycol | 0.569 | 0.558 | 0.579 | 0.590 | 0.595 | 0.611 |
| Excess Functionality | 0.117 | 0.134 | 0.147 | 0.160 | 0.173 | 0.193 |
| Softening Point EC |  | 94 | 100 | 97 | 106 | 120 |
| Acid Number |  | 22.5 | 22 | 21 | 21.5 | 22.5 |

*Standard branched polyester used in the industry.

EXAMPLE 2

Effect of Gellant Level on Misting and G' in Ink Formulations (Comparative)

Figure 1A:
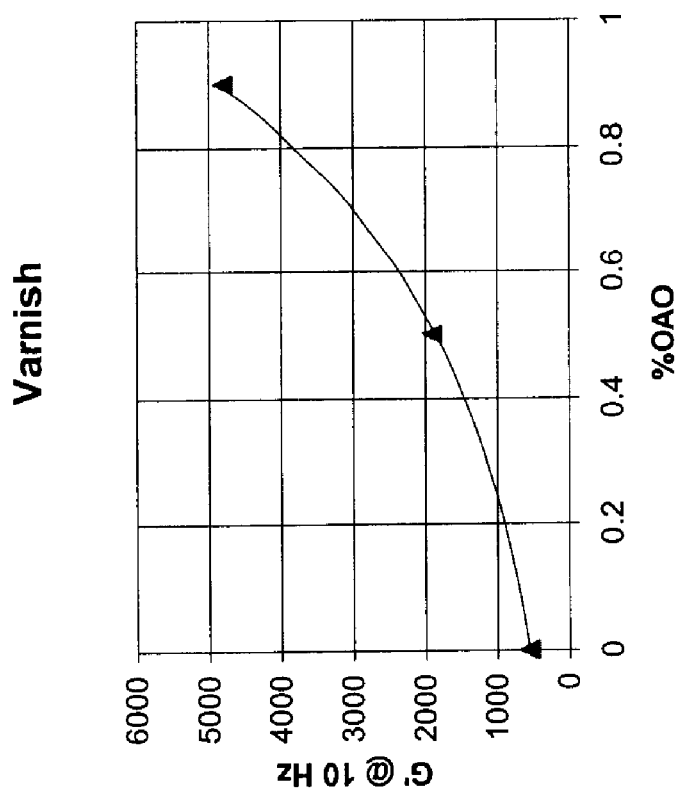

The level of gellant in the UV varnish was varied from 0 to 0.9% in five steps. The inks formulated were then tested for misting using a Thwing Albert electronic inkometer, and for rheology using a Carri-Med CSL 500 rheometer. The gellant levels of the varnishes were 0.0%, 0.25%, 0.5%, 0.75%, and 0.9%. Contrary to what was expected, inks produced using higher gellant levels had lower elasticity (G') and had greater misting than inks using little or no gellant (see FIG. 1A). In fact, the inks with the least gellant (0 and 0.25%) yielded the least misting and highest elasticity (see Table 2, for formulas and misting results). To simplify the investigation, Cyan inks (containing BP#1) were used as the standard since all pigment colors (such as Magenta and Yellow) showed the same results.

TABLE 2

Misting of Inks vs. Degree of Gelation of Varnishes

| Ingredient | Ink #1 | Ink #2 | Ink #3 | Ink #4 | Ink #5 |
|---|---|---|---|---|---|
| Grind Veh. | 46 | 46 | 46 | 46 |  |
| Blue | 14.7 | 14.7 | 14.7 | 14.7 | 46 |
| Additives | 18.4 | 18.4 | 18.4 | 18.4 | 14.7 |
| TMPTA | 25.9 | 5.9 | 5.9 | 5.9 | 18.4 |
| Photoinitiator | 3.8 | 3.8 | 3.8 | 3.8 | 5.9 |
| Varnish #1 (0% Gellant) | 11.2 |  |  |  | 3.8 |
| Varnish #2 (025% Gellant) |  | 11.2 |  |  |  |
| Varnish #3 (0.50% Gellant) |  |  | 11.2 |  |  |
| Varnish #4 (0.75% Gellant) |  |  |  | 11.2 |  |
| Varnish #5 (0.9% Gellant) |  |  |  |  | 11.2 |
| G = @ 10 Hz | 179.000 | 180.000 | 170.000 | 121.000 | 93.000 |
| Misting 1–5 | 5 | 4 | 3 | 2 | 1 |

TMPTA = Trimethylol propane triacrylate

EXAMPLE 3

Effect of Highly Branched Polyester Resins on Misting and Rheology

A varnish was made up of a polyester resin cut into Benzoflex 400, a commercial plasticizer. The resin is made up of five components. Benzoic acid and Palmitic acid are both monofunctional, chain terminating acidic components. Phthalic Anhydride is a difunctional acidic component. The alcohol components are Neopentyl Glycol, which is difunctional, and Pentaerythritol, which has four functional hydroxyl groups and imparts branching. Using a computer program, the ratio of the components can be changed to give a predicted MW or degree of branching.

The molecular weight can be altered by changing the ratio of acid to alcohol. By making this ratio close to one, the molecular weight will increase. The MW of the inks in this Example was relatively constant at about 3,000. The amount of branching can be changed by varying the ratio of multi-functional (3 functional groups or more) to monofunctional components. In this case, the multifunctional component was pentaerythritol. The amount of branching in the polyester resin that forms the basis of the let down varnish was altered by changing the ratios of the components that make up the polymer. The amount of excess functionality was altered, and the reaction conditions changed in order to produce polymers that had varying amounts of branching, but similar molecular weights. In order to maintain these similar weights, polymers with more branching have a shorter overall chain length, but more branch points and side chains. These additional side chains were tested to see if they would give the ink more structure through controlled covalent crosslinking, which would mimic a gellant, without the unwanted effects of H-bonding.

An ungelled standard varnish was used with different types of branched polyesters. The varnish in ink#1 contains Branched Polyester#1 which is the standard commercial resin. A number of resins were synthesized as described in Example 1 and Table 1. After initial screening, six were chosen for further investigation. There was one resin with less branching than the standard, and four resins with more branching than the standard. At the highest level, no monofunctional reagents (chain terminators) were used resulting in a very highly branched resin. These resins were cut into Benzoflex 400 and in turn formulated into an ink in exact percentages. The results as shown in Table 3 indicate that as the level of branching is increased, the misting of the inks formulated from these resins decreased. This is true up to almost the highest levels of branching. At the very highest levels(BP#6, not shown in Table 3), i.e. no chain terminators, the varnish was very heavy, and the misting became worse. This was probably due to the extremely high viscosity of the varnish, and this resin was not used in the study. All other samples followed the theory that increased branching resulted in more structure, and reduced misting (see Table 3 for formulas and misting results).

TABLE 3

Misting Control of Inks by Covalent Bonding

| Ingredient | Ink #6 | Ink #1* | Ink #7 | Ink #8 | Ink #9 |
|---|---|---|---|---|---|
| Grind Veh. | 45.4 | 45.4 | 45.4 | 45.4 | 45.4 |
| Blue Pigment | 14.5 | 14.5 | 14.5 | 14.5 | 14.5 |
| TMPTA | 5.8 | 5.8 | 5.8 | 5.8 | 5.8 |
| Photoinitiator | 4 | 4 | 4 | 4 | 4 |
| Additives | 18.7 | 18.7 | 18.7 | 18.7 | 18.7 |
| Varnish containing BP #2 | 11.6 | | | | |
| Varnish containing BP #1 | | 11.6 | | | |
| Varnish containing BP #3 | | | 11.6 | | |
| Varnish containing BP #4 | | | | 11.6 | |
| Varnish containing BP #5 | | | | | 11.6 |
| G = @ 10 Hz | 180.000 | 178.00 | 192.500 | 190.000 | 215.600 |
| Misting 1–5 | 1 | 2 | 3 | 4 | 5 |

TMPTA = Trimethylol propane triacrylate

Figure 2:
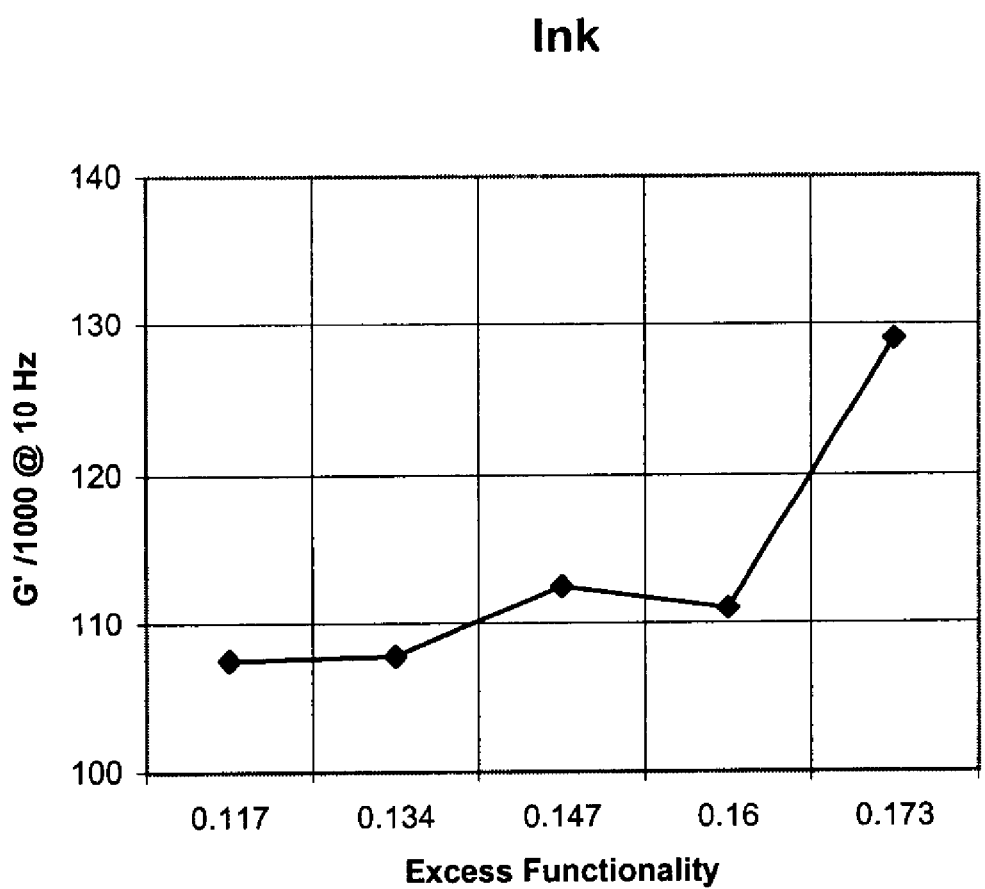
FIG. 2 shows the effect of increased branching (expressed in excess functionality) of the polyester resin on elasticity (G') in UV curable ink formulations.

This result was confirmed in the Carri-Med analysis of the inks. A reduction in branching results in inks with less elasticity (G'), which has already been shown to correlate to more misting (FIG. 2). Increasing the branching (i.e. increasing the excess functionality) resulted in higher G' values (FIG. 2). This reached a maximum value after which the varnish became too elastic and did not mix well into the ink and the misting increased.

The present invention has been described in detail, including the preferred embodiments thereof. However, it will be apparent to those of skill in the art, upon consideration of the present disclosure, that the invention is capable of numerous modifications, substitutions, rearrangements of parts and/or improvements without departing from the spirit and scope of the invention.

What is claimed is:

1. An improved actinic radiation curable printing ink composition consisting essentially of:

an actinic radiation curable monomer;

a photo initiator;

a pigment;

a grind vehicle; and a polyester, whereby the improvement comprises: using a branched polyester containing monofunctional and multifunctional components and having an excess functionality of about 0.10 to 0.18.

2. The printing ink composition of claim 1, wherein the excess functionality is about 0.14 to 0.16.

3. The printing ink composition of claim 1, wherein the multifunctional components comprise hydroxyl and carboxylic acid groups.

4. The printing ink composition of claim 1, wherein the monofunctional components comprise saturated, unsaturated, aliphatic, cycloaliphatic or aromatic acid or alcohol.

5. The printing ink composition of claim 4, wherein the monofunctional components comprise benzoic acid and/or palmitic acid.

6. The printing ink composition of claim 1, wherein the branched polyester further includes difunctional components.

7. The printing ink composition of claim 6, wherein the difunctional components comprise phthalic anhydride and/or neopentyl glycol.

8. The printing ink composition of claim 6, wherein the multifunctional components are selected from the group consisting of trimethylpropane, pentaerythritol and trimellitic anhydride.

9. The printing ink composition of claim 1, wherein the average molecular weight of the branched polyester is about 1,000 to 10,000.

10. The printing ink composition of claim 1, wherein the average molecular weight of the branched polyester is about 2,000 to 4,000.

11. An improved actinic radiation curable varnish consisting essentially of:

an actinic radiation curable monomer; and a polyester, whereby the improvement comprises: using a branched polyester containing monofunctional and multifunctional components and having an excess functionality of about 0.10 to 0.18.

12. The varnish of claim 11 wherein the multifunctional components comprise hydroxyl and carboxylic acid groups.

13. The varnish of claim 11 wherein the monofunctional components comprise saturated, unsaturated, aliphatic, cycloaliphatic or aromatic acid or alcohol.

14. The varnish of claim 13, wherein the monofunctional components comprise benzoic acid and/or palmitic acid.

15. The varnish of claim 11, wherein the multifunctional components are selected from the group consisting of trimethylpropane, pentaerythitol and trimellitic anhydride.

16. The varnish of claim 11, wherein the average molecular weight of the branched polyester is about 1,000 to 10,000.

17. An improved method of reducing misting and/or dot gain in an actinic radiation curable printing composition consisting essentially of an actinic radiation curable monomer, a pigment, a grind vehicle, and a photoiniator and adding to said composition a polyester, whereby the improvement comprises: using a branched polyester containing monofunctional and multifunctional components and having an excess functionality of about 0.10 to 0.18.

* * * * *